United States Patent
Matsuura et al.

(10) Patent No.: US 10,138,359 B2
(45) Date of Patent: Nov. 27, 2018

(54) RUBBER COMPOSITION FOR TIRES AND PNEUMATIC TIRE

(71) Applicant: SUMITOMO RUBBER INDUSTRIES, LTD., Kobe-shi, Hoygo (JP)

(72) Inventors: Ai Matsuura, Kobe (JP); Lucksanaporn Tarachiwin, Pluakdaeng (TH); Hathainat Kum-Ourm, Pluakdaeng (TH)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 367 days.

(21) Appl. No.: 14/864,087

(22) Filed: Sep. 24, 2015

(65) Prior Publication Data

US 2016/0102193 A1     Apr. 14, 2016

(30) Foreign Application Priority Data

Oct. 8, 2014 (JP) ................................. 2014-207275

(51) Int. Cl.
  *C08L 7/00*   (2006.01)
  *B60C 1/00*   (2006.01)
  *C08C 1/00*   (2006.01)
  *C08C 1/04*   (2006.01)

(52) U.S. Cl.
  CPC ........ *C08L 7/00* (2013.01); *B60C 1/00* (2013.01); *C08C 1/00* (2013.01); *C08C 1/04* (2013.01)

(58) Field of Classification Search
  CPC ................ C08C 1/00; C08C 1/04; C08L 7/00
  See application file for complete search history.

(56) References Cited

U.S. PATENT DOCUMENTS

| 2005/0234186 A1* | 10/2005 | Kondou | .................. B60C 1/00 |
| | | | 524/575.5 |
| 2013/0066021 A1* | 3/2013 | Ichikawa | .............. B60C 1/0016 |
| | | | 525/333.1 |

FOREIGN PATENT DOCUMENTS

| JP | 8-12814 A | 1/1996 |
| JP | 11-12306 A | 1/1999 |
| JP | 3294901 B2 | 6/2002 |
| JP | 2004-250546 A | 9/2004 |
| JP | 2005-82622 A | 3/2005 |
| JP | 2011-144326 A | 7/2011 |
| JP | 4726490 B2 | 7/2011 |
| JP | 4815117 B2 | 11/2011 |
| JP | 2011-256309 A | 12/2011 |
| JP | 2014-9243 A | 1/2014 |

* cited by examiner

*Primary Examiner* — Peter D. Mulcahy
(74) *Attorney, Agent, or Firm* — Birch, Stewart, Kolasch & Birch, LLP

(57) ABSTRACT

The present invention aims to provide rubber compositions for tires that contain a natural rubber achieving a balanced improvement in abrasion resistance, breaking performance, and processability to achieve a balanced improvement in abrasion resistance, breaking performance, and processability, and also provide pneumatic tires containing such rubber compositions for tires. Included is a rubber composition for tires comprising a modified natural rubber prepared by treating natural rubber latex with a proteolytic enzyme, and then treating the treated natural rubber latex with a lipolytic enzyme and/or a phospholipid degrading enzyme. Also included is a rubber composition for tires, comprising a modified natural rubber prepared by centrifuging natural rubber latex to recover a latex fraction comprising latex particles having an average particle size of 0.25 μm or less.

9 Claims, No Drawings

RUBBER COMPOSITION FOR TIRES AND PNEUMATIC TIRE

TECHNICAL FIELD

The present invention relates to rubber compositions for tires, and pneumatic tires containing such rubber compositions.

BACKGROUND ART

Fuel efficiency of vehicles has been increased by reducing the rolling resistance of tires to suppress heat build-up. In recent years, such contributions of tires to an increase in fuel efficiency have been increasingly demanded. There has previously been a great need to improve the fuel efficiency of treads, among other tire components, which constitute a large portion of a tire. More recently, there has been a need not only for treads but also for sidewalls, insulation components, breaker cushions, and the like to have higher fuel efficiency.

Known approaches to improve the fuel efficiency of rubber compositions include the use of low reinforcing filler, or the use of a smaller amount of reinforcing filler. Another known approach for improving fuel efficiency is to use silica filler to reduce rolling resistance. However, these approaches reduce the reinforcing properties of rubber compositions, and therefore disadvantageously reduce breaking performance, such as flex crack growth resistance, and abrasion resistance.

In particular, tires for trucks and buses are used under very severe conditions, and thus treads of tires for trucks and buses require high abrasion resistance as well as high breaking performance sufficient to prevent chipping of treads, etc. To satisfy this requirement, the compositions for treads of tires for trucks and buses typically contain natural rubber and/or polybutadiene rubber. There have been attempts in recent years to further improve abrasion resistance by increasing the cis content or the molecular weight of polybutadiene rubber, or by subjecting polybutadiene rubber to modification for carbon black. In contrast, unlike polybutadiene rubber, there is at present very little development of techniques for natural rubber, which is a main component of the composition for treads of tires for trucks and buses, because it is a natural product.

Accordingly, the development of a natural rubber having high abrasion resistance and high breaking performance has been required.

Natural rubber is mainly formed of polyisoprene. Unlike synthetic polyisoprenes, it has a high gel fraction. The term "gel fraction" refers to a fraction poorly soluble in a solvent. It is believed that the gel fraction is derived from branched structures formed by large amounts of protein, lipids and the like contained as impurities in natural rubber. In fact, it is known that the gel component is reduced to some extent by deproteinization to remove proteins as allergenic substances.

For example, Patent Literatures 1 and 2 disclose methods of reducing proteins and the like contained in natural rubber by adding a proteolytic enzyme and a surfactant to natural rubber latex, and aging the mixture. Besides, in order to reduce the gel content in natural rubber, Patent Literature 3 discloses a method of immersing a solid natural rubber swollen with a solvent in an alkali hydroxide; Patent Literature 4 discloses a method of adding a phosphate to natural rubber latex and then removing magnesium phosphate; and Patent Literature 5 discloses a method of adding a surfactant to natural rubber latex followed by washing. Moreover, Patent Literature 6 discloses a method of preparing a natural rubber having a low Mooney viscosity by treating natural rubber latex with a phospholipase or lipase. Furthermore, Patent Literature 7 discloses a method for coagulation of natural rubber using a polymer flocculant.

CITATION LIST

Patent Literature

Patent Literature 1: JP H08-12814 A
Patent Literature 2: JP 2005-82622 A
Patent Literature 3: JP H11-12306 A
Patent Literature 4: JP 2004-250546 A
Patent Literature 5: Japanese Patent No. 3294901
Patent Literature 6: Japanese Patent No. 4726490
Patent Literature 7: Japanese Patent No. 4815117

SUMMARY OF INVENTION

Technical Problem

It is thought that the gel structures in natural rubber enable the natural rubber itself to have high tensile strength and high tear strength, which are characteristics of high molecular weight polymers. On the other hand, it is known that the processability of natural rubber is greatly affected by the gel component present in the raw rubber, and high gel content results in deteriorated processability. For this reason, a peptizer is usually added and kneaded into natural rubber to reduce the viscosity before use. This is considered to prevent natural rubber from exerting the high-molecular-weight properties intrinsic to natural rubber. Moreover, the natural rubbers prepared by using the methods disclosed in Patent Literatures 1 to 7 still have room for improvement in performance. Consequently, the development of a natural rubber achieving a balanced improvement in abrasion resistance, breaking performance, and processability has been desired.

The present invention aims to solve the above problems and provide rubber compositions for tires containing a natural rubber achieving a balanced improvement in abrasion resistance, breaking performance, and processability to achieve a balanced improvement in abrasion resistance, breaking performance, and processability, and also provide pneumatic tires containing such rubber compositions for tires.

Solution to Problem

A first aspect of the present invention relates to a rubber composition for tires, comprising a modified natural rubber, the modified natural rubber prepared by treating natural rubber latex with a proteolytic enzyme, and then treating the treated natural rubber latex with at least one of a lipolytic enzyme or a phospholipid degrading enzyme.

In the rubber composition according to the first aspect of the present invention, the modified natural rubber is preferably prepared by centrifuging the natural rubber latex before the treatment with the proteolytic enzyme.

In the rubber composition according to the first aspect of the present invention, the modified natural rubber preferably has a nitrogen content of 0.30 mass % or less.

In the rubber composition according to the first aspect of the present invention, the modified natural rubber preferably has a phosphorus content of 200 ppm or less.

In the rubber composition according to the first aspect of the present invention, the modified natural rubber preferably has a gel content of 20 mass % or less.

In the rubber composition according to the first aspect of the present invention, a molecular weight of a peak maximum on a high molecular weight side in a molecular weight distribution of the modified natural rubber is preferably 20% or more smaller than a molecular weight of a peak maximum on a high molecular weight side in a molecular weight distribution of the natural rubber.

In the rubber composition according to the first aspect of the present invention, a molecular weight of a peak maximum on a high molecular weight side in a molecular weight distribution of the modified natural rubber is preferably $2.0 \times 10^6$ or more.

In the rubber composition according to the first aspect of the present invention, the modified natural rubber is preferably prepared by further coagulating the resulting natural rubber latex with (1) an acid and (2) at least one of: (i) at least one salt selected from the group consisting of calcium salts, sodium salts, potassium salts, and ammonium salts of nitric acid, sulfuric acid, carbonic acid, phosphoric acid, hydrochloric acid, and formic acid; and (ii) a polymer flocculant.

The first aspect of the present invention also relates to a method of producing a modified natural rubber, comprising: a step of treating natural rubber latex with a proteolytic enzyme; and a step of treating the natural rubber latex treated in the previous step with at least one of a lipolytic enzyme or a phospholipid degrading enzyme.

A second aspect of the present invention relates to a rubber composition for tires, comprising a modified natural rubber, the modified natural rubber prepared by centrifuging natural rubber latex to recover a latex fraction comprising latex particles having an average particle size of 0.25 μm or less.

In the rubber composition according to the second aspect of the present invention, the modified natural rubber is preferably prepared by, after recovering the latex fraction by centrifugation: treating the recovered latex fraction with at least one enzyme selected from the group consisting of a proteolytic enzyme, a lipolytic enzyme, and a phospholipid degrading enzyme.

In the rubber composition according to the second aspect of the present invention, the modified natural rubber is preferably prepared by, after recovering the latex fraction by centrifugation: treating the recovered latex fraction with a proteolytic enzyme, and then treating the treated latex fraction with at least one of a lipolytic enzyme or a phospholipid degrading enzyme.

In the rubber composition according to the second aspect of the present invention, the modified natural rubber preferably has a nitrogen content of 0.30 mass % or less.

In the rubber composition according to the second aspect of the present invention, the modified natural rubber preferably has a phosphorus content of 200 ppm or less.

In the rubber composition according to the second aspect of the present invention, the modified natural rubber preferably has a gel content of 20 mass % or less.

In the rubber composition according to the second aspect of the present invention, the modified natural rubber is preferably prepared by further coagulating the resulting latex fraction with (1) an acid and (2) at least one of: (i) at least one salt selected from the group consisting of calcium salts, sodium salts, potassium salts, and ammonium salts of nitric acid, sulfuric acid, carbonic acid, phosphoric acid, hydrochloric acid, and formic acid; and (ii) a polymer flocculant.

The second aspect of the present invention also relates to a method of producing a modified natural rubber, comprising a step of centrifuging natural rubber latex to recover a latex fraction comprising latex particles having an average particle size of 0.25 μm or less.

The present invention also relates to pneumatic tires containing each of the rubber compositions for tires described above.

Advantageous Effects of Invention

The rubber compositions for tires according to present invention contain a modified natural rubber prepared by treating natural rubber latex with a proteolytic enzyme, and then treating the treated natural rubber latex with a lipolytic enzyme and/or a phospholipid degrading enzyme (the first aspect of the present invention), or contain a modified natural rubber prepared by centrifuging natural rubber latex to recover a latex fraction containing latex particles having an average particle size of 0.25 μm or less (the second aspect of the present invention). Such rubber compositions achieve a balanced improvement in abrasion resistance, breaking performance, and processability.

DESCRIPTION OF EMBODIMENTS

The rubber composition for tires according to the first aspect of the present invention contains a modified natural rubber prepared by treating natural rubber latex with a proteolytic enzyme, and then treating the treated natural rubber latex with a lipolytic enzyme and/or a phospholipid degrading enzyme. The present inventors have found that the treatment of natural rubber latex firstly with a proteolytic enzyme allows the subsequent treatment with a lipolytic enzyme and/or a phospholipid degrading enzyme to be performed efficiently, and the modified natural rubber thus prepared has a good balance of excellent abrasion resistance, breaking performance, and processability. The present inventors infer that this is because the branched structures in natural rubber can be efficiently broken by the treatment with a proteolytic enzyme followed by the treatment with a lipolytic enzyme and/or a phospholipid degrading enzyme. The use of such a modified natural rubber enables a rubber composition for tires to achieve a balanced improvement in abrasion resistance, breaking performance, and processability.

The treatment with a proteolytic enzyme can be carried out by any method that allows natural rubber latex to be treated with a proteolytic enzyme, such as, for example, by adding a proteolytic enzyme (protease) into natural rubber latex to perform an enzymatic reaction. As a result of the enzymatic reaction, the proteins attached or adsorbed to rubber particles are decomposed or converted into low molecular weight products, thereby being transferred to the aqueous phase.

Any natural rubber latex (NR latex) collected by tapping the bark in rubber plantations can be used. The natural rubber latex to be used may be selected from those usually used in the rubber industry, such as those prepared by centrifugation followed by separating and recovering a cream fraction, and then redispersing it, and those purified by ultrafiltration or the like.

Natural rubber latex is collected as sap by tapping the bark of hevea trees in rubber plantations. It contains water, proteins, lipids, inorganic salts, etc. in addition to the rubber component. The gel fraction in the rubber is thought to be derived from a complex of various impurities therein. The natural rubber latex used in the first aspect of the present invention may be any raw latex taken from hevea trees by tapping. It may be a purified latex prepared by concentration by centrifugation. It may also be a high ammonia latex prepared by adding ammonia by a usual method to prevent the progress of decay of raw rubber latex due to bacteria present in the latex and thereby avoid coagulation of the latex.

The natural rubber latex to be subjected to the treatment with a proteolytic enzyme can have any solid content (dry rubber content (DRC), mass %). The solid content is preferably 1 to 60 mass %, more preferably 5 to 40 mass %.

The protease may be any of various proteolytic enzymes commonly used. Examples include, but are not limited to, Alcalase 2.5 L, Type DX (made by Novozymes A/S) and Proleather FG-F (made by Amano Enzyme Inc.). Among these, preferred are alkaline proteases such as Alcalase 2.5 L, Type DX (made by Novozymes A/S). The protease may be derived from any of bacteria, molds, and yeasts. In particular, it is preferably a yeast-derived protease. These proteases may be used either each alone or in combinations of two or more thereof. Moreover, these proteases may be used in combination with a cellulase, amylase, lipase, esterase or the like, as necessary.

The amount of the protease to be added is preferably 0.01 to 1.0 part by mass relative to 100 parts by mass of the solid content in the natural rubber latex (solids in the natural rubber latex). If the protease is added in an amount less than the above range, the proteins in the latex may not be sufficiently decomposed. Conversely, an amount more than the above range may cause reduced enzymatic activity and increased cost. The amount of the protease to be added is more preferably 0.05 to 0.5 parts by mass relative to 100 parts by mass of the solid content in the natural rubber latex.

The treatment with a proteolytic enzyme is preferably carried out by using the protease in combination with a surfactant. The surfactant assists (promotes) the transfer to the aqueous phase of the proteins which have been attached or adsorbed to rubber particles but are decomposed or converted into low molecular weight products by action of the protease and thereby transferred to the aqueous phase. The surfactant also stably disperses the rubber particles, which become unstable in water as a result of decomposition or conversion into low molecular weight products of the proteins attached or adsorbed to the rubber particles. Furthermore, the surfactant assists (promotes) the removal of impurities by washing in the washing step after the formation of a modified natural rubber.

Examples of surfactants that can be used include (a) anionic surfactants, such as carboxylate, sulfonate, sulfate ester, and phosphate ester surfactants; (b) nonionic surfactants, such as polyoxyalkylene ether, polyoxyalkylene ester, polyhydric alcohol fatty acid ester, sugar fatty acid ester, alkylpolyglycoside, and polyoxyalkylene polyglucoside surfactants; and (c) amphoteric surfactants, such as amino acid, betaine, imidazoline, and amine oxide surfactants. These surfactants may be used alone or in combinations or two or more.

Specific examples of (a) anionic surfactants are shown below.

Examples of the carboxylate anionic surfactants include fatty acid salts, polyvalent carboxylates, polycarboxylates, rosinates, dimer acid salts, polymer acid salts, tall oil fatty acid salts, polyoxyalkylene alkyl ether acetates, and polyoxyalkylene alkylamide ether acetates.

Examples of the sulfonate anionic surfactants include alkylbenzene sulfonates, alkyl sulfonates, alkylnaphthalene sulfonates, naphthalene sulfonates, naphthalene sulfonate-aldehyde condensates, aryl sulfonate-aldehyde condensates, alkyl diphenyl ether disulfonates, dialkyl sulfosuccinates, and α-olefin sulfonates.

Examples of the sulfate ester anionic surfactants include alkyl sulfate ester salts, polyoxyalkylene alkyl sulfate ester salts, polyoxyalkylene alkylphenyl ether sulfates, mono-, di-, or tristyrylphenyl sulfate ester salts, and polyoxyalkylene mono-, di-, or tristyrylphenyl sulfate ester salts.

Examples of the phosphate ester anionic surfactants include alkyl phosphate ester salts, alkylphenol phosphate ester salts, polyoxyalkylene alkyl ether phosphate ester salts, polyoxyalkylene alkylphenyl ether phosphate ester salts, and polyoxyalkylene mono-, di-, or tristyrylphenyl ether phosphate ester salts.

Examples of these compound salts include metal salts (e.g. salts of Na, K, Ca, Mg, or Zn), ammonia salts, and alkanolamine salts (e.g. triethanolamine salts).

Specific examples of (b) nonionic surfactants are shown below.

Examples of the polyoxyalkylene ether nonionic surfactants include polyoxyalkylene alkyl ethers, polyoxyalkylene alkylphenyl ethers, polyoxyalkylene polyol alkyl ethers, and polyoxyalkylene mono-, di-, or tristyrylphenyl ethers. The polyol is preferably a polyhydric alcohol having 2 to 12 carbon atoms, such as propylene glycol, glycerol, sorbitol, glucose, sucrose, pentaerythritol, sorbitan or the like.

Examples of the polyoxyalkylene ester nonionic surfactants include polyoxyalkylene fatty acid esters and polyoxyalkylene alkylrosin acid esters.

Examples of the polyhydric alcohol fatty acid ester nonionic surfactants include fatty acid esters of C2 to C12 polyhydric alcohols, and fatty acid esters of polyoxyalkylene polyhydric alcohols. More specific examples include sorbitol fatty acid esters, sorbitan fatty acid esters, glycerol fatty acid esters, polyglycerol fatty acid esters, and pentaerythritol fatty acid esters. Polyalkylene oxide adducts of the foregoing (e.g., polyoxyalkylene sorbitan fatty acid esters and polyoxyalkylene glycerol fatty acid esters) can also be used.

Examples of the sugar fatty acid ester nonionic surfactants include fatty acid esters of sucrose, glucose, maltose, fructose, and polysaccharides. Polyalkylene oxide adducts of the foregoing can also be used.

Regarding the alkylpolyglycoside nonionic surfactants, the glycoside may be glucose, maltose, fructose, sucrose, or the like. Examples include alkylglucosides, alkylpolyglucosides, polyoxyalkylene alkylglucosides, and polyoxyalkylene alkylpolyglucosides, as well as fatty acid esters of the foregoing. Polyalkylene oxide adducts of all the foregoing compounds can also be used.

Other examples include polyoxyalkylene alkylamines and alkyl alkanolamides.

Examples of the alkyl groups in these surfactants include linear or branched, saturated or unsaturated alkyl groups having 4 to 30 carbon atoms. Moreover, examples of the polyoxyalkylene groups include those having C2 to C4 alkylene groups, such as adducts with about 1 to 50 moles of ethylene oxide. Examples of the fatty acids include linear or branched, saturated or unsaturated fatty acids having 4 to 30 carbon atoms.

Specific examples of (c) amphoteric surfactants are shown below.

Examples of the amino acid amphoteric surfactants include acyl amino acid salts, acyl sarcosinates, acyloyl methyl aminopropionates, alkyl aminopropionates, and acylamidoethyl amino hydroxyethyl methyl carboxylates.

Examples of the betaine amphoteric surfactants include alkyldimethyl betaines, alkylhydroxyethyl betaines, acylamidopropyl hydroxypropyl ammoniosulfobetaines, acylamidopropyl hydroxypropyl ammoniosulfobetaines, and amidopropyl dimethylcarboxymethyl ammoniobetaine ricinoleates.

Examples of the imidazoline amphoteric surfactants include alkylcarboxymethyl hydroxyethyl imidazolinium betaines, and alkylethoxy carboxymethyl carboxymethyl imidazolium betaines.

Examples of the amine oxide amphoteric surfactants include alkyldimethylamine oxides.

Among these surfactants, preferred are the (a) anionic surfactants, more preferred are the sulfate ester anionic surfactants, and still more preferred are the polyoxyalkylene alkyl sulfate ester salts. Particularly preferred are polyoxyalkylene alkyl sulfate ester metal salts, such as sodium polyoxyethylene lauryl ether sulfate.

The amount of the surfactant to be added is preferably 0.01 to 5.0 parts by mass relative to 100 parts by mass of the solid content in the natural rubber latex (solids in the natural rubber latex). The surfactant added in an amount falling within this range can sufficiently exert its advantageous effect. The amount of the surfactant to be added is more preferably 0.05 to 3.0 parts by mass relative to 100 parts by mass of the solid content in the natural rubber latex.

Other additives such as pH adjusters may be further appropriately added in the treatment with a proteolytic enzyme.

Any pH adjuster commonly used can be used. Examples include, but are not limited to: phosphates, such as monopotassium phosphate, dipotassium phosphate, and sodium phosphate; acetates, such as potassium acetate and sodium acetate; acids and salts thereof, such as sulfuric acid, acetic acid, hydrochloric acid, nitric acid, citric acid, and succinic acid; ammonia, sodium hydroxide, potassium hydroxide, sodium carbonate, and sodium hydrogen carbonate.

The treatment temperature and the treatment time for the treatment with a proteolytic enzyme can be appropriately chosen so that the enzymatic reaction progresses properly. The treatment temperature is preferably 70° C. or less, more preferably 60° C. or less, and still more preferably 50° C. or less. The treatment temperature is particularly preferably 35° C. or less. A treatment temperature of more than 70° C. may reduce the stability of the natural rubber latex, so that the latex may coagulate during the enzymatic treatment. Conversely, the treatment temperature is preferably 10° C. or more. Moreover, the treatment time is, for example, preferably 30 minutes to 48 hours, more preferably 1 hour to 36 hours.

The enzymatic treatment may be carried out with stirring to accelerate the reaction, or may be carried out while standing. The stirring may be carried out using a stirrer, for example.

In the first aspect of the present invention, a modified natural rubber is prepared by treating natural rubber latex with a proteolytic enzyme, and then treating the treated natural rubber latex with a lipolytic enzyme and/or a phospholipid degrading enzyme. The natural rubber latex obtained after the treatment with the proteolytic enzyme may be subjected directly to the treatment with a lipolytic enzyme and/or a phospholipid degrading enzyme, without performing a purification process and the like, or may be subjected to a purification process and the like prior to the treatment with a lipolytic enzyme and/or a phospholipid degrading enzyme. In particular, it is preferably purified, before the treatment with a lipolytic enzyme and/or a phospholipid degrading enzyme, to remove impurities, such as decomposed products.

The purification may be carried out by any method that can remove impurities, such as decomposed products. Examples of such methods include common purification processes, such as centrifugation or ultrafiltration. In the centrifugation process, the natural rubber latex is purified by centrifugation into a serum (heavy liquid fraction) and then concentration of the rubber component in the serum. The ultrafiltration process, on the other hand, allows only decomposed products of the proteins to be filtered through an ultrafiltration membrane. The purification conditions in these purification processes can be appropriately chosen.

In the first aspect of the present invention, the treatment with a lipolytic enzyme and/or a phospholipid degrading enzyme can be carried out by any method that allows the natural rubber latex treated with the proteolytic enzyme to be treated with a lipolytic enzyme and/or a phospholipid degrading enzyme. For example, it may be carried out by, after treating natural rubber latex with the proteolytic enzyme and purifying the latex by the above purification process: adding a lipolytic enzyme (lipase) and/or a phospholipid degrading enzyme (phospholipase) into the resulting latex to perform an enzymatic reaction. As a result of the enzymatic reaction, the lipids and phospholipids attached or adsorbed to rubber particles are decomposed or converted into low molecular products, thereby being transferred to the aqueous phase.

The natural rubber latex to be subjected to the treatment with a lipolytic enzyme and/or a phospholipid degrading enzyme can have any solid content (dry rubber content (DRC), mass %). The solid content is preferably 1 to 60 mass %, more preferably 5 to 40 mass %.

The lipase may be any of various lipolytic enzymes commonly used. Examples include, but are not limited to, Lipase M "Amano" 10 (made by Amano Enzyme Inc.), Lipase OF (made by Meito Sangyo Co., Ltd.), and Lipase from porcine pancreas (made by Sigma-Aldrich Corporation). Among these, preferred is Lipase from porcine pancreas (made by Sigma-Aldrich Corporation). The lipase may be derived from any of bacteria, molds, yeasts, and animals. These lipases may be used either each alone or in combinations of two or more thereof.

The phospholipase may be any of various phospholipid degrading enzymes commonly used. Examples include, but are not limited to, Phospholipase A1 (made by Mitsubishi-Kagaku Foods Corporation), and Phospholipase C from *Clostridium perfringens* (made by Sigma-Aldrich Corporation). Among these, preferred is Phospholipase C from *Clostridium perfringens* (made by Sigma-Aldrich Corporation). The phospholipase may be derived from any of bacteria, molds, and yeasts. These phospholipases may be used either each alone or in combinations of two or more thereof.

In the treatment with a lipolytic enzyme and/or a phospholipid degrading enzyme, these enzymes may be used in combination further with a cellulase, amylase, lipase, esterase or the like, as necessary.

The amount of the lipase and/or phospholipase to be added (this represents the amount of the lipase or phospholipase added if either of these enzymes is used alone, and represents the combined amount of the lipase and the phospholipase added if both enzymes are used) is preferably 0.005 to 1.0 part by mass relative to 100 parts by mass of the solid content in the natural rubber latex (solids in the natural rubber latex). If the lipase and/or phospholipase is added in an amount less than the above range, the lipids and phospholipids in the latex may not be sufficiently degraded. Conversely, an amount of more than the above range may cause reduced enzymatic activity and increased cost. The amount of the lipase and/or phospholipase to be added is more preferably 0.01 to 0.5 parts by mass relative to 100 parts by mass of the solid content in the natural rubber latex.

The treatment with a lipolytic enzyme and/or a phospholipid degrading enzyme may be carried out by using the lipase and/or phospholipase in combination with surfactants and other additives such as pH adjusters as in the treatment with a proteolytic enzyme described above. The types of surfactant and other additives and the amounts thereof added are as described above.

The treatment temperature and the treatment time for the treatment with a lipolytic enzyme and/or a phospholipid degrading enzyme can be appropriately chosen so that the enzymatic reaction progresses properly. For example, the treatment temperature and the treatment time may be as described in the treatment with a proteolytic enzyme. The enzymatic treatment may be carried out with stirring to accelerate the reaction, or may be carried out while standing. The stirring may be carried out using a stirrer, for example.

In the first aspect of the present invention, centrifugation may be performed before the treatment with a proteolytic enzyme. The centrifugation can be carried out in the same manner as described later for the centrifugation process in the second aspect of the present invention. When such a centrifugation process is performed before the treatment with a proteolytic enzyme, a latex fraction containing latex particles having an average particle size of 0.25 µm or less is then subjected to the treatment with a proteolytic enzyme, thereby resulting in a modified natural rubber having a further improved balance of abrasion resistance, breaking performance, and processability.

Thus, another suitable embodiment of the present invention is a rubber composition of the first aspect of the present invention wherein the modified natural rubber is prepared by centrifuging the natural rubber latex before the treatment with a proteolytic enzyme.

In the first aspect of the present invention, the modified natural rubber in the first aspect of the present invention is obtained as a result of the treatment with a lipolytic enzyme and/or a phospholipid degrading enzyme. The resulting modified natural rubber may be further subjected to the purification process and the like described above, as necessary.

The modified natural rubber in the first aspect of the present invention is preferably prepared through coagulation. Such a modified natural rubber prepared through coagulation can have a further improved balance of abrasion resistance, breaking performance, and processability.

The coagulation of the modified natural rubber may be carried out by a usual coagulation method that includes adding an acid to adjust the pH so that coagulation occurs. Preferred is a method of mixing the modified natural rubber latex with (1) an acid and (2): (i) at least one salt selected from the group consisting of calcium salts, sodium salts, potassium salts, and ammonium salts of nitric acid, sulfuric acid, carbonic acid, phosphoric acid, hydrochloric acid, and formic acid; and/or (ii) a polymer flocculant to produce a porous coagulated rubber. Thus, in another suitable embodiment of the present invention, the modified natural rubber is prepared by further coagulating the resulting natural rubber latex with (1) an acid and (2): (i) at least one salt selected from the group consisting of calcium salts, sodium salts, potassium salts, and ammonium salts of nitric acid, sulfuric acid, carbonic acid, phosphoric acid, hydrochloric acid, and formic acid; and/or (ii) a polymer flocculant.

As described above, the coagulation of the modified natural rubber in the first aspect of the present invention is preferably carried out using a coagulation system containing (1) an acid and (2) a specific salt and/or a polymer flocculant. In particular, the coagulation system particularly preferably contains (1) an acid and (2) (ii) a polymer flocculant.

The acid may be any of organic acids and inorganic acids. Suitable examples of the organic acid include formic acid and acetic acid. Suitable examples of the inorganic acid include sulfuric acid, hydrochloric acid, and carbonic acid. Among these, more preferred is formic acid or sulfuric acid. These acids may be used alone or in combinations of two or more.

The specific salt is at least one salt selected from the group consisting of calcium salts, sodium salts, potassium salts, and ammonium salts of nitric acid, sulfuric acid, carbonic acid, phosphoric acid, hydrochloric acid, and formic acid. These salts may be used alone or in combinations of two or more. Among these, preferred are calcium salts of the acids listed above. Examples of the specific salt include calcium nitrate, sodium nitrate, potassium nitrate, ammonium nitrate, calcium sulfate, sodium sulfate, sodium carbonate, and calcium chloride. Among these, preferred is calcium chloride.

The polymer flocculant may be any of anionic, cationic, and nonionic polymer flocculants. These polymer flocculants may be used alone or in combinations of two or more.

Examples of the anionic polymer flocculants include sodium alginate, CMC-Na, poly(sodium acrylate), acrylamide-sodium acrylate copolymers, and partially hydrolyzed products of polyacrylamide.

Examples of the cationic polymer flocculants include polymethacrylic acid ester polymer flocculants, hydrochlorides of water-soluble aniline resins, polyethyleneimine, polyamine, poly(diallyldimethylammonium chloride), chitosan, hexamethylenediamine-epichlorohydrin condensates, poly(vinylimidazoline), poly(alkylamino (meth)acrylate), Mannich modified polyacrylamides, and dimethylaminoethyl acrylate/acrylamide copolymers.

Examples of the nonionic polymer flocculants include starch, guar gum, gelatin, polyacrylamide, and polyethylene oxide.

Among the polymer flocculants described above, preferred are cationic polymer flocculants, and more preferred are polymethacrylic acid ester polymer flocculants.

The pH during coagulation using the coagulation system is preferably 3.0 or more, more preferably 3.5 or more. The pH is also preferably 6.5 or less, more preferably 5.5 or less.

Moreover, the temperature during coagulation is not particularly limited. Typically, the temperature preferably ranges approximately from room temperature (25° C.) to 80° C.

Moreover, in the coagulation system, the concentration of the salt in the entire mixture is preferably 0.5 mass % or more, more preferably 1.0 mass % or more, while it is preferably 3.0 mass % or less, more preferably 2.0 mass % or less.

In the coagulation system, the amount of the polymer flocculant, on the other hand, to be added is preferably 0.001 parts by mass or more, more preferably 0.01 parts by mass or more relative to 100 parts by mass of the solid content in the modified natural rubber latex. The amount is also preferably 1.0 part by mass or less, more preferably 0.75 parts by mass or less.

The procedures for the coagulation with the coagulation system are as follows: after the specific salt and/or the polymer flocculant is preliminarily added to the modified natural rubber latex in the first aspect of the present invention and they are homogeneously mixed, the acid may be added to coagulate the latex; or alternatively, after the acid is preliminarily added to the modified natural rubber latex in the first aspect of the present invention, the specific salt and/or the polymer flocculant may be added to coagulate the latex. Furthermore, the specific salt and/or the polymer flocculant, and the acid may be simultaneously added to the modified natural rubber latex in the first aspect of the present invention to coagulate the latex. All of these methods allow coagulation to occur rapidly to yield a porous coagulated rubber which is a porous crumb slurry having a large surface area. Stirring is preferably performed to homogenously mix the components, to cream the latex, and to promote coagulation. The stirring may be carried out using a stirrer, for example. Since the thus prepared porous coagulated rubber has a large surface area, it can be washed to remove impurities efficiently. There is a tendency that the phosphorus derived from phospholipids cannot be washed off as readily as the nitrogen derived from proteins is. Accordingly, it is preferred that washing be sufficiently performed until the phosphorus content in the modified natural rubber reaches 200 ppm or less. This allows the effect of the present invention to be suitably achieved.

The modified natural rubber latex to be subjected to the coagulation system can have any solid content (dry rubber content (DRC), mass %). The solid content is preferably 1 to 60 mass %, more preferably 5 to 40 mass %.

The nitrogen content in the modified natural rubber in the first aspect of the present invention is preferably 0.30 mass % or less, more preferably 0.15 mass % or less. A nitrogen content of more than 0.30 mass % may result in an increase in Mooney viscosity during storage, deteriorating processability.

The nitrogen content can be determined by conventional methods, such as a combustion method or a Kjeldahl method. The nitrogen to be analyzed is derived from proteins.

The phosphorus content in the modified natural rubber is preferably 200 ppm or less, more preferably 150 ppm or less. A phosphorus content of more than 200 ppm may result in an increase in Mooney viscosity during storage, deteriorating processability.

The phosphorus content can be determined by conventional methods, such as ICP emission analysis. The phosphorus to be analyzed is derived from phospholipids.

The gel content in the modified natural rubber is preferably 20 mass % or less, more preferably 10 mass % or less. A gel content of more than 20 mass % tends to result in an increase in Mooney viscosity deteriorating processability.

Throughout the specification, the gel content is defined as the amount of matter insoluble in the nonpolar solvent toluene as determined on rubber, and is hereinafter referred to as "gel content" or simply as "gel fraction."

The content of gel fraction is determined as follows. First, a natural rubber sample is immersed in dehydrated toluene and then left in a cold dark place for one week while being shielded from light, and the toluene solution is then centrifuged at $1.3 \times 10^5$ rpm for 30 minutes to separate an insoluble gel fraction from a toluene soluble fraction. Methanol is added to the insoluble gel fraction to solidify the gel fraction, followed by drying. The gel content is determined from the ratio of the mass of the dried gel fraction to the original mass of the sample.

Natural rubber generally has a bimodal molecular weight distribution. The molecular weight of the peak maximum on the high molecular weight side in the molecular weight distribution of the modified natural rubber in the first aspect of the present invention is preferably 20% or more smaller, more preferably 30% or more smaller than the molecular weight of the peak maximum on the high molecular weight side in the molecular weight distribution of the starting material natural rubber. If the molecular weight of the peak maximum on the high molecular weight side is reduced by less than 20%, a high Mooney viscosity and poor processability tend to be obtained. Although the upper limit of the magnitude of reduction is not particularly limited, it is preferably 80% or less, more preferably 50% or less.

The molecular weight of the peak maximum on the high molecular weight side in the molecular weight distribution of the modified natural rubber is preferably $2.0 \times 10^6$ or more, more preferably $2.2 \times 10^6$ or more. When the molecular weight of the peak maximum on the high molecular weight side in the molecular weight distribution of the modified natural rubber falls within the range described above, the effect of the present invention can be sufficiently achieved.

The molecular weight of the modified natural rubber can be determined by the method described later in Examples.

The modified natural rubber in the first aspect of the present invention is prepared by treating natural rubber latex with a proteolytic enzyme, and then treating the treated natural rubber latex with a lipolytic enzyme and/or a phospholipid degrading enzyme, as described above. The rubber composition for tires of the first aspect of the present invention containing the modified natural rubber prepared by such a method achieves a balanced improvement in abrasion resistance, breaking performance, and processability. Thus, the first aspect of the present invention also includes a method of producing a modified natural rubber, including: a step (step 1) of treating natural rubber latex with a proteolytic enzyme; and a step (step 2) of treating the natural rubber latex treated in step 1 with a lipolytic enzyme and/or a phospholipid degrading enzyme.

The method of producing a modified natural rubber may include other steps as long as it includes step 1 and step 2. For example, step 1 may be preceded by a step (step 0) of centrifuging natural rubber latex to recover a latex fraction containing latex particles having an average particle size of 0.25 µm or less. Moreover, step 2 is preferably followed by a coagulation step (step 3) of coagulating the modified natural rubber latex. In particular, the coagulation step is more preferably a step of coagulating the modified natural rubber latex with (1) an acid and (2): (i) at least one salt selected from the group consisting of calcium salts, sodium salts, potassium salts, and ammonium salts of nitric acid, sulfuric acid, carbonic acid, phosphoric acid, hydrochloric acid, and formic acid; and/or (ii) a polymer flocculant, as described above. Besides, the method may include a step of performing the purification process as described above.

The specific procedures of steps 0, 1, 2, and 3 are as described above.

The rubber composition for tires according to the second aspect of the present invention contains a modified natural rubber prepared by centrifuging natural rubber latex to recover a latex fraction containing latex particles having an average particle size of 0.25 µm or less. It is generally known that natural rubber latex contains natural rubber particles having an average particle size of about 1 µm and has a bimodal molecular weight distribution. The present inventors have found that if a small particle size fraction with an average particle size of 0.25 μm or less is recovered from these rubber particles, and a latex fraction formed of such a small particle size fraction is used to prepare a modified natural rubber, the resulting modified natural rubber has a good balance of excellent abrasion resistance, breaking performance, and processability. The use of such a modified natural rubber can provide a rubber composition for tires achieving a balanced improvement in abrasion resistance, breaking performance, and processability.

In the second aspect of the present invention, natural rubber latex is centrifuged to recover a latex fraction containing latex particles having an average particle size of 0.25 μm or less. The centrifugation can be carried out by usual centrifugation methods. The conditions, such as number of rotations, and rotation time, are appropriately chosen to perform centrifugation, and a serum is then recovered, whereby a latex fraction containing latex particles having an average particle size of 0.25 μm or less can be obtained.

The average particle size of latex particles in the latex fraction is preferably 0.15 μm or less, more preferably 0.10 μm or less, while it is preferably 0.03 μm or more, more preferably 0.05 μm or more.

The average particle size of latex particles can be determined from the measurement of particle size distribution using a laser diffraction particle size distribution analyzer.

The conditions for the centrifugation process can be appropriately chosen so as to obtain a latex fraction containing latex particles having an average particle size within the desired range as described above, and the conditions are not particularly limited. The following is a preferred example of conditions used to obtain a latex fraction containing latex particles having an average particle size of 0.25 μm or less: natural rubber latex is subjected to at least the following three centrifugation stages in this order: a first centrifugation performed at a centrifugal force of 3000 to 8000×g, preferably 4000 to 6000×g, for 15 to 60 minutes, preferably 20 to 40 minutes; a second centrifugation performed at a centrifugal force of 8500 to 15000×g, preferably 9000 to 12000×g, for 30 minutes to 2 hours, preferably 45 minutes to 1.5 hours; and a third centrifugation performed at a centrifugal force of 20000 to 50000×g, preferably 25000 to 40000×g, for 30 minutes to 3 hours, preferably 45 minutes to 2 hours. This preferred embodiment of the centrifugation process will be more specifically described as follows. Natural rubber latex is subjected to the first centrifugation to remove the supernatant cream and recover the serum. The recovered serum is subjected to the second centrifugation to recover the serum in the same manner. Further, the serum recovered through the second centrifugation is subjected to the third centrifugation to recover the serum. With such a centrifugation process, a latex fraction containing latex particles having an average particle size of 0.25 μm or less can be recovered.

Although the temperature for the centrifugation process is not particularly limited, it is, for example, preferably 1° C. or more, more preferably 5° C. or more. The temperature is also preferably 50° C. or less, more preferably 40° C. or less, still more preferably 35° C. or less. In one preferred embodiment, the centrifugation process is performed at room temperature (25° C.)

The natural rubber latex used may be as described for the natural rubber latex in the first aspect of the present invention.

The natural rubber latex to be subjected to the centrifugation process can have any solid content (dry rubber content (DRC), mass %). The solid content is preferably 1 to 60 mass %, more preferably 5 to 40 mass %.

In the second aspect of the present invention, it is preferred that after the latex fraction obtained through the centrifugation process is recovered, the recovered latex fraction be treated with at least one enzyme selected from the group consisting of a proteolytic enzyme, a lipolytic enzyme, and a phospholipid degrading enzyme. The modified natural rubber prepared through the centrifugation process followed by the enzymatic treatment can have a further improved balance of abrasion resistance, breaking performance, and processability.

The types of proteolytic enzyme, lipolytic enzyme, and phospholipid degrading enzyme and the methods of treatment with these enzymes are as described in the first aspect of the present invention.

A purification process may be performed after the enzymatic treatment. The purification process is also as described in the first aspect of the present invention.

In the second aspect of the present invention, in particular, it is more preferred that after the latex fraction obtained through the centrifugation process is recovered, the recovered latex fraction be treated with a proteolytic enzyme and then treated with a lipolytic enzyme and/or a phospholipid degrading enzyme.

The method for the treatment with a proteolytic enzyme followed by the treatment with a lipolytic enzyme and/or a phospholipid degrading enzyme is also as described in the first aspect of the present invention. The purification process described above may be performed after each enzymatic treatment, as described in the first aspect of the present invention.

In the second aspect of the present invention, the modified natural rubber in the second aspect of the present invention is prepared through the centrifugation process, more preferably followed by the enzymatic treatment process. The obtained modified natural rubber may be further subjected to the purification process and the like described above, as necessary.

The modified natural rubber in the second aspect of the present invention is preferably prepared through coagulation. Such a modified natural rubber prepared through coagulation can have a further improved balance of abrasion resistance, breaking performance, and processability. The coagulation of the modified natural rubber is carried out as described in the first aspect of the present invention.

Thus, in another suitable embodiment of the present invention, the modified natural rubber in the second aspect of the present invention is prepared by further coagulating the resulting latex fraction with (1) an acid and (2): (i) at least one salt selected from the group consisting of calcium salts, sodium salts, potassium salts, and ammonium salts of nitric acid, sulfuric acid, carbonic acid, phosphoric acid, hydrochloric acid, and formic acid; and/or (ii) a polymer flocculant.

The nitrogen content in the modified natural rubber in the second aspect of the present invention is preferably 0.30 mass % or less, more preferably 0.15 mass % or less. A nitrogen content of more than 0.30 mass % may result in an increase in Mooney viscosity during storage, deteriorating processability.

The nitrogen content can be determined by conventional methods, such as a combustion method or a Kjeldahl method. The nitrogen to be analyzed is derived from proteins.

The phosphorus content in the modified natural rubber in the second aspect of the present invention is preferably 200 ppm or less, more preferably 150 ppm or less. A phosphorus content of more than 200 ppm may result in an increase in Mooney viscosity during storage, deteriorating processability.

The phosphorus content can be determined by conventional methods, such as ICP emission analysis. The phosphorus to be analyzed is derived from phospholipids.

The gel content in the modified natural rubber in the second aspect of the present invention is preferably 20 mass % or less, more preferably 10 mass % or less. A gel content of more than 20 mass % tends to result in an increase in Mooney viscosity deteriorating processability.

The gel content is determined as described above.

The modified natural rubber in the second aspect of the present invention is prepared by centrifuging natural rubber latex to recover a latex fraction containing latex particles having an average particle size of 0.25 µm or less, as described above. The rubber composition for tires of the second aspect of the present invention containing the modified natural rubber prepared by such a method achieves a balanced improvement in abrasion resistance, breaking performance, and processability. Thus, the second aspect of the present invention also includes a method of producing a modified natural rubber, including a step (step A) of centrifuging natural rubber latex to recover a latex fraction containing latex particles having an average particle size of 0.25 µm or less.

The method of producing a modified natural rubber may include other steps as long as it includes step A. For example, step A is preferably followed by: a step (step B) of treating the latex fraction recovered in step A with at least one enzyme selected from the group consisting of a proteolytic enzyme, a lipolytic enzyme, and a phospholipid degrading enzyme; or a step (step B') of treating the latex fraction recovered in step A with a proteolytic enzyme, and then treating the treated latex fraction with a lipolytic enzyme and/or a phospholipid degrading enzyme. Moreover, a coagulation step (step C) of coagulating the modified latex fraction is preferably performed after step A or after step B or step B' if step A is followed by step B or step B. In particular, the coagulation step is more preferably a step of coagulating the modified latex fraction with (1) an acid and (2): (i) at least one salt selected from the group consisting of calcium salts, sodium salts, potassium salts, and ammonium salts of nitric acid, sulfuric acid, carbonic acid, phosphoric acid, hydrochloric acid, and formic acid; and/or (ii) a polymer flocculant, as described above. Besides, the method may include a step of performing the purification process described above.

The specific procedures of steps A, B, B', and C are as described above.

In the rubber compositions according to the first and second aspects of the present invention, the amount of the modified natural rubber based on 100 mass % of the rubber component is preferably 5 mass % or more, more preferably 10 mass % or more, still more preferably 30 mass % or more, particularly preferably 35 mass % or more. The amount is most preferably 60 mass % or more. An amount of less than 5 mass % may not sufficiently improve abrasion resistance, breaking performance, and processability. The amount is preferably 95 mass % or less, more preferably 90 mass % or less, still more preferably 85 mass % or less. An amount of more than 95 mass % may deteriorate the durability of tires.

In the rubber compositions according to the first and second aspects of the present invention, the rubber component may contain other rubber materials in a range that does not inhibit the effect. Examples of other rubber materials include natural rubber (NR) (not modified), polyisoprene rubber (IR), polybutadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). Among these, preferred is BR because then good abrasion resistance, breaking performance, and processability can be obtained.

Any BR can be used, such as BR having high cis content and BR containing syndiotactic polybutadiene crystals. Among these, preferred is BR having a cis content of 95 mass % or more.

The amount of BR based on 100 mass % of the rubber component is preferably 10 mass % or more, more preferably 15 mass % or more. An amount of less than 10 mass % may not provide sufficient breaking performance. The amount is preferably 95 mass % or less, more preferably 90 mass % or less, still more preferably 70 mass % or less, particularly preferably 65 mass % or less. An amount of more than 95 mass % corresponds to a reduced amount of the modified natural rubber, which may not achieve a balanced improvement in abrasion resistance, breaking performance, and processability.

The combined amount of the modified natural rubber and BR based on 100 mass % of the rubber component is preferably 80 mass % or more, particularly preferably 100 mass %. When the combined amount falls within the range mentioned above, excellent abrasion resistance, breaking performance, and processability can be obtained.

The rubber composition according to the first or second aspect of the present invention preferably further contains carbon black. Examples of usable carbon black include, but are not limited to, GPF, FEF, HAF, ISAF, and SAF. The use of carbon black produces a reinforcement effect, and its use with the modified natural rubber allows the effect of the present invention to be well achieved.

The nitrogen adsorption specific surface area ($N_2SA$) of carbon black is preferably 20 $m^2/g$ or more, more preferably 35 $m^2/g$ or more, still more preferably 70 $m^2/g$ or more, particularly preferably 100 $m^2/g$ or more. A $N_2SA$ of less than 20 $m^2/g$ may result in insufficient reinforcing properties and thus insufficient breaking performance and abrasion resistance. The $N_2SA$ is preferably 200 $m^2/g$ or less, more preferably 150 $m^2/g$ or less. A $N_2SA$ of more than 200 $m^2/g$ tends to lead to difficulties in dispersing carbon black well, and therefore to reduced processability.

The $N_2SA$ of carbon black is determined by the method A set forth in JIS K 6217-2:2001.

The dibutyl phthalate oil absorption number (DBP) of carbon black is preferably 50 ml/100 g or more, more preferably 70 ml/100 g or more, still more preferably 90 ml/100 g or more. The oil absorption number is also preferably 150 ml/100 g or less, more preferably 140 ml/100 g or less, still more preferably 120 ml/100 g or less. When the oil absorption number falls within the range described above, excellent breaking performance can be obtained.

The DBP of carbon black is determined according to JIS K6217-4:2001.

When the rubber composition of the first or second aspect of the present invention contains carbon black, the amount of carbon black per 100 parts by mass of the rubber component is preferably 5 parts by mass or more, more preferably 10 parts by mass or more, still more preferably 15 parts by mass or more, particularly preferably 30 parts by mass or more, most preferably 40 parts by mass or more. An amount of less than 5 parts by mass may provide insufficient reinforcing properties, resulting in insufficient breaking performance and abrasion resistance. The amount is preferably 100 parts by mass or less, more preferably 85 parts by mass or less, still more preferably 80 parts by mass or less, particularly preferably 70 parts by mass or less, most preferably 60 parts by mass or less. If the amount is more than 100 parts by mass, such carbon black tends to be difficult to disperse well, and processability tends to be reduced.

The rubber compositions according to the first and second aspects of the present invention may appropriately contain, in addition to the above components, compounding agents commonly used in the tire industry, such as silica, silane coupling agents, zinc oxide, stearic acid, antioxidants, oil, sulfur, and vulcanization accelerators.

The rubber compositions according to the first and second aspects of the present invention can be prepared by usual methods. Specifically, for example, the rubber compositions can be prepared by kneading the components with a Banbury mixer, a kneader, an open roll mill, an internal mixer or the like and then vulcanizing the kneaded mixture.

The rubber compositions according to the first and second aspects of the present invention can be used in various tire components (e.g. treads, sidewalls, carcasses, belts, beads, insulation components, breaker cushions).

The pneumatic tires according to the present invention can be manufactured by usual methods using the rubber composition according to the first or second aspect of the present invention. Specifically, the unvulcanized rubber composition according to the first or second aspect of the present invention is extruded into the shape of a tire component such as a tread, and then formed together with other tire components on a tire building machine by a usual method to build an unvulcanized tire, which is then heated under pressure in a vulcanizer, whereby a pneumatic tire of the present invention can be formed.

The pneumatic tires according to the present invention can be suitably used as tires for passenger cars, tires for trucks and buses, tires for two-wheeled vehicles, racing tires, and the like and especially as tires for passenger cars.

EXAMPLES

The present invention will be specifically described with reference to examples, but the present invention is not limited only to these examples.

The chemicals used in Production Examples are listed below:

Natural rubber latex: field latex available from THAITEX

Proteolytic enzyme: alkaline protease

Surfactant: "Emal-E" (sodium polyoxyethylene lauryl ether sulfate) made by Kao Corporation Lipolytic enzyme: Lipase from porcine pancreas made by Sigma-Aldrich Corporation Phospholipid degrading enzyme: Phospholipase C from *Clostridium perfringens* made by Sigma-Aldrich Corporation Formic acid: formic acid made by Wako Pure Chemical Industries, Ltd.

Calcium chloride: calcium chloride made by Wako Pure Chemical Industries, Ltd.

Polymer flocculant: "ARONFLOC C-303" (polymethacrylic acid ester polymer flocculant) made by MT Aqua-Polymer, Inc.

Preparation of Modified Natural Rubber

Production Example 1

<Deproteinization>

The solid content (DRC) of the natural rubber latex was adjusted to 30 mass %, and then 0.07 parts by mass of the proteolytic enzyme and 1.5 parts by mass of the surfactant were added relative to 100 parts by mass of the solid content in the natural rubber latex, followed by leaving the latex to stand at 30° C. for 24 hours. After the standing, the latex was centrifuged at 13,000 rpm for 30 minutes and a cream fraction separated as the upper layer was removed. The cream fraction was redispersed in the same volume of water to prepare a deproteinized natural rubber latex.

<Lipid Degradation>

The solid content (DRC) of the deproteinized natural rubber latex was adjusted to 30 mass %, and then 0.05 parts by mass of the lipolytic enzyme was added relative to 100 parts by mass of the solid content in the natural rubber latex, followed by leaving the latex to stand at room temperature (25° C.) for 24 hours. After the standing, the latex was centrifuged at 13,000 rpm for 30 minutes and a cream fraction separated as the upper layer was removed. The cream fraction was redispersed in the same volume of water to prepare a modified natural rubber latex.

<Coagulation with Acid>

The solid content (DRC) of the modified natural rubber latex was adjusted to 30 mass %, and then 5 mass % formic acid was added to adjust the pH to 4.0 to 4.5. The latex was left to stand for a predetermined period so that the rubber component was coagulated, and then the coagulated rubber component was squeezed with a roll to remove the serum. Thereafter, the rubber component was repeatedly washed with water, and dried in an oven at 45° C. to prepare modified natural rubber 1 as a solid.

Production Example 2

<Deproteinization>

The same procedure was followed as in Production Example 1.

<Lipid Degradation>

The same procedure was followed as in Production Example 1.

<Coagulation with Salt>

The same deproteinization and lipid degradation procedures were followed as in Production Example 1 to prepare a modified natural rubber latex, which was then diluted with water until the solid content (DRC) reached 15 mass %. Then formic acid was added with slow stirring to adjust the pH to 4.0 to 4.5. Thereto was added 10 mL of a 10 mass % calcium chloride aqueous solution, so that fine aggregates were obtained. Thereafter, the separated aqueous phase was removed from the bottom, followed by washing. Then, water was added again for dilution and washing until the DRC reached 15 mass %, followed by discharging water again to remove water-soluble components. This cycle of washing operation was repeated to prepare modified natural rubber 2 as a coagulum containing water.

Production Example 3

<Deproteinization>

The same procedure was followed as in Production Example 1.

<Lipid Degradation>

The same procedure was followed as in Production Example 1.

<Coagulation with Polymer Flocculant>

The same deproteinization and lipid degradation procedures were followed as in Production Example 1 to prepare a modified natural rubber latex, which was then diluted with water until the solid content (DRC) reached 15 mass %. Then formic acid was added with slow stirring to adjust the pH to 4.0 to 4.5. Thereto was added 0.01 parts by mass of a 0.1 mass % aqueous solution of the polymer flocculant relative to 100 parts by mass of the solid content in the modified natural rubber latex, so that fine aggregates were obtained. Thereafter, the separated aqueous phase was removed from the bottom, followed by washing. Then, water was added again for dilution and washing until the DRC reached 15 mass %, followed by discharging water again to remove water-soluble components. This cycle of washing operation was repeated to prepare modified natural rubber 3 as a coagulum containing water.

Production Example 4

<Deproteinization>

The same procedure was followed as in Production Example 1.

<Phospholipid Degradation>

The solid content (DRC) of the deproteinized natural rubber latex obtained by following the same deproteinization procedure as in Production Example 1 was adjusted to 30 mass %, and then 0.05 parts by mass of the phospholipid degrading enzyme was added relative to 100 parts by mass of the solid content in the natural rubber latex, followed by leaving the latex to stand at room temperature (25° C.) for 24 hours. After the standing, the latex was centrifuged at 13,000 rpm for 30 minutes and a cream fraction separated as the upper layer was removed. Then the cream fraction was redispersed in the same volume of water to prepare a modified natural rubber latex.

<Coagulation with Acid>

The modified natural rubber latex was coagulated with the acid in the same manner as in Production Example 1 to prepare modified natural rubber 4 as a solid.

Production Example 5

<Deproteinization>

The same procedure was followed as in Production Example 1.

<Phospholipid Degradation>

The same procedure was followed as in Production Example 4.

<Coagulation with Salt>

The modified natural rubber latex obtained by following the same deproteinization and phospholipid degradation procedures as in Production Example 4 was coagulated with the salt in the same manner as in Production Example 2 to prepare modified natural rubber 5 as a coagulum containing water.

Production Example 6

<Deproteinization>

The same procedure was followed as in Production Example 1.

<Phospholipid Degradation>

The same procedure was followed as in Production Example 4.

<Coagulation with Polymer Flocculant>

The modified natural rubber latex obtained by following the same deproteinization and phospholipid degradation procedures as in Production Example 4 was coagulated with the polymer flocculant in the same manner as in Production Example 3 to prepare modified natural rubber 6 as a coagulum containing water.

Production Example 7

<Lipid Degradation>

The solid content (DRC) of the natural rubber latex was adjusted to 30 mass %, and then 0.05 parts by mass of the lipolytic enzyme was added relative to 100 parts by mass of the solid content in the natural rubber latex, followed by leaving the latex to stand at room temperature (25° C.) for 24 hours. After the standing, the latex was centrifuged at 13,000 rpm for 30 minutes and a cream fraction separated as the upper layer was removed. Then the cream fraction was redispersed in the same volume of water to prepare a lipid-degraded natural rubber latex.

<Deproteinization>

The solid content (DRC) of the lipid-degraded natural rubber latex was adjusted to 30 mass %, and then 0.07 parts by mass of the proteolytic enzyme and 1.5 parts by mass of the surfactant were added relative to 100 parts by mass of the solid content in the natural rubber latex, followed by leaving the latex to stand at 30° C. for 24 hours. After the standing, the latex was centrifuged at 13,000 rpm for 30 minutes and a cream fraction separated as the upper layer was removed. Then the cream fraction was redispersed in the same volume of water to prepare a deproteinized natural rubber latex.

<Coagulation with Polymer Flocculant>

The deproteinized natural rubber latex was coagulated with the polymer flocculant in the same manner as in Production Example 3 to prepare comparative modified natural rubber 7 as a coagulum containing water.

Production Example 8

<Phospholipid Degradation>

The solid content (DRC) of the natural rubber latex was adjusted to 30 mass %, and then 0.05 parts by mass of the phospholipid degrading enzyme was added relative to 100 parts by mass of the solid content in the natural rubber latex, followed by leaving the latex to stand at room temperature (25° C.) for 24 hours. After the standing, the latex was centrifuged at 13,000 rpm for 30 minutes and a cream fraction separated as the upper layer was removed. Then the cream fraction was redispersed in the same volume of water to prepare a phospholipid-degraded natural rubber latex.

<Deproteinization>

The phospholipid-degraded natural rubber latex was deproteinized in the same manner as in Production Example 7 to prepare a deproteinized natural rubber latex.

<Coagulation with Polymer Flocculant>

The deproteinized natural rubber latex was coagulated with the polymer flocculant in the same manner as in Production Example 3 to prepare comparative modified natural rubber 8 as a coagulum containing water.

Production Example 9

<Deproteinization and Lipid Degradation>

The solid content (DRC) of the natural rubber latex was adjusted to 30 mass %, and then 0.07 parts by mass of the proteolytic enzyme, 0.05 parts by mass of the lipolytic enzyme, and 1.5 parts by mass of the surfactant were added relative to 100 parts by mass of the solid content in the natural rubber latex, followed by leaving the latex to stand at 30° C. for 24 hours. After the standing, the latex was centrifuged at 13,000 rpm for 30 minutes and a cream fraction separated as the upper layer was removed. Then the cream fraction was redispersed in the same volume of water to prepare a deproteinized, lipid-degraded natural rubber latex.

<Coagulation with Polymer Flocculant>

The deproteinized, lipid-degraded natural rubber latex was coagulated with the polymer flocculant in the same manner as in Production Example 3 to prepare comparative modified natural rubber 9 as a coagulum containing water.

Production Example 11

<Centrifugation>

The solid content (DRC) of the natural rubber latex was adjusted to 30 mass %, and then the natural rubber latex was centrifuged at a centrifugal force of 5000×g for 30 minutes to remove the supernatant cream and recover the serum. The serum was centrifuged at a centrifugal force of 10000×g for one hour to recover the serum in the same manner. The serum was further centrifuged at a centrifugal force of 30000×g for two hours to recover the serum in the same manner, whereby a small particle size latex fraction (modified natural rubber latex) was prepared.

<Coagulation with Polymer Flocculant>

The modified natural rubber latex was coagulated with the polymer flocculant in the same manner as in Production Example 3 to prepare modified natural rubber 11 as a coagulum containing water.

Production Example 12

<Centrifugation>

The same procedure was followed as in Production Example 11.

<Deproteinization>

The solid content (DRC) of the small particle size latex fraction obtained by following the same centrifugation procedure as in Production Example 11 was adjusted to 30 mass %, and then deproteinized in the same manner as in Production Example 1, except that the centrifugation was carried out at a centrifugal force of 30000×g for two hours to remove the cream fraction. Thus, a deproteinized natural rubber latex (modified natural rubber latex) was prepared.

<Coagulation with Polymer Flocculant>

The modified natural rubber latex was coagulated with the polymer flocculant in the same manner as in Production Example 3 to prepare modified natural rubber 12 as a coagulum containing water.

Production Example 13

<Centrifugation>

The same procedure was followed as in Production Example 11.

<Lipid Degradation>

The solid content (DRC) of the small particle size latex fraction obtained by following the same centrifugation procedure as in Production Example 11 was adjusted to 30 mass %, and then lipid-degraded in the same manner as in Production Example 1, except that the centrifugation was carried out at a centrifugal force of 30000×g for two hours to remove the cream fraction. Thus, a lipid-degraded natural rubber latex (modified natural rubber latex) was prepared.

<Coagulation with Polymer Flocculant>

The modified natural rubber latex was coagulated with the polymer flocculant in the same manner as in Production Example 3 to prepare modified natural rubber 13 as a coagulum containing water.

Production Example 14

<Centrifugation>

The same procedure was followed as in Production Example 11.

<Phospholipid Degradation>

The solid content (DRC) of the small particle size latex fraction obtained by following the same centrifugation procedure as in Production Example 11 was adjusted to 30 mass %, and then phospholipid-degraded in the same manner as in Production Example 4, except that the centrifugation was carried out at a centrifugal force of 30000×g for two hours to remove the cream fraction. Thus, a phospholipid-degraded natural rubber latex (modified natural rubber latex) was prepared.

<Coagulation with Polymer Flocculant>

The modified natural rubber latex was coagulated with the polymer flocculant in the same manner as in Production Example 3 to prepare modified natural rubber 14 as a coagulum containing water.

Production Example 15

<Centrifugation>

The same procedure was followed as in Production Example 11.

<Deproteinization>

The solid content (DRC) of the small particle size latex fraction obtained by following the same centrifugation procedure as in Production Example 11 was adjusted to 30 mass % and then deproteinized in the same manner as in Production Example 12 to prepare a deproteinized natural rubber latex.

<Lipid Degradation>

The solid content (DRC) of the deproteinized natural rubber latex was adjusted to 30 mass %, and then lipid-degraded in the same manner as in Production Example 13 to prepare a lipid-degraded natural rubber latex (modified natural rubber latex).

<Coagulation with Acid>

The modified natural rubber latex was coagulated with the acid in the same manner as in Production Example 1 to prepare modified natural rubber 15 as a solid.

Production Example 16

<Centrifugation>

The same procedure was followed as in Production Example 11.

<Deproteinization>

The same procedure was followed as in Production Example 15.

<Lipid Degradation>

The same procedure was followed as in Production Example 15.

<Coagulation with Polymer Flocculant>

The modified natural rubber latex obtained by following the same centrifugation, deproteinization, and lipid degradation procedures as in Production Example 15 was coagulated with the polymer flocculant in the same manner as in Production Example 3 to prepare modified natural rubber 16 as a coagulum containing water.

Production Example 17

<Centrifugation>

The same procedure was followed as in Production Example 11.

<Deproteinization>

The same procedure was followed as in Production Example 15.

<Phospholipid Degradation>

The solid content (DRC) of the deproteinized natural rubber latex obtained by following the same centrifugation and deproteinization procedures as in Production Example 15 was adjusted to 30 mass % and then phospholipid-degraded in the same manner as in Production Example 14 to prepare a phospholipid-degraded natural rubber latex (modified natural rubber latex).

<Coagulation with Polymer Flocculant>

The modified natural rubber latex was coagulated with the polymer flocculant in the same manner as in Production Example 3 to prepare modified natural rubber 17 as a coagulum containing water.

Production Example 18

<Coagulation with Polymer Flocculant>

The natural rubber latex was diluted with water until the solid content (DRC) reached 15 mass %. Then formic acid was added with slow stirring to adjust the pH to 4.0 to 4.5. Thereto was added 0.01 parts by mass of a 0.1 mass % aqueous solution of the polymer flocculant relative to 100 parts by mass of the solid content in the natural rubber latex, so that fine aggregates were obtained. Thereafter, the separated aqueous phase was removed from the bottom, followed by washing. Then, water was added again for dilution and washing until the DRC reached 15 mass %, followed by discharging water again to remove water-soluble components. This cycle of washing operation was repeated to prepare comparative natural rubber as a coagulum containing water.

The modified natural rubbers 1 to 6 and 11 to 17, comparative modified natural rubbers 7 to 9, and comparative natural rubber were measured for nitrogen content, phosphorus content, gel content, rate of change in high molecular weight components, and average particle size by the methods described below. The results are shown in Tables 1 and 2.

(Determination of Nitrogen Content)

Nitrogen content was determined with CHN CORDER MT-5 (made by Yanaco Analytical Instruments Inc.). In this determination, antipyrine was used as a reference substance to prepare a calibration curve for determining nitrogen content. Then, about 10 mg samples of the natural rubbers prepared in the production examples were weighed and then measured three times to calculate an average value. The average of the three measurements was taken as the nitrogen content of the sample.

(Determination of Phosphorus Content)

Phosphorus content of the natural rubber samples prepared in the production examples was determined with an ICP emission spectrometer (ICPS-8100, made by SHIMADZU CORPORATION).

(Determination of Gel Content)

70.00 mg samples (1 mm×1 mm cut pieces) of the natural rubbers prepared in the production examples were weighed, and 35 mL of toluene was added to each sample, which was then left to stand in a cold dark place for one week. Then, the sample was centrifuged at $1.3 \times 10^5$ rpm for 30 minutes to precipitate a gel fraction insoluble in toluene. After the soluble supernatant fraction was removed, only the gel fraction was solidified with methanol and then dried and measured for mass. Gel content (mass %) was determined using the following equation:

$$\text{Gel content (mass \%)} = [\text{mass (mg) of dried gel fraction}]/[\text{original mass (mg) of sample}] \times 100.$$

(Molecular Weight of Peak Maximum on High Molecular Weight Side, Rate of Change in High Molecular Weight Components)

Weight average molecular weight (Mw) of the starting material natural rubber and the modified natural rubbers was determined by gel permeation chromatography (GPC) under the conditions (1) to (8) described below. In the bimodal molecular weight distributions observed for the starting material natural rubber and the modified natural rubbers, the molecular weight of the peak maximum on the high molecular weight side was determined, and the rate of change in high molecular weight components was then determined using the following equation.

$$\text{Rate (\%) of change in high molecular weight components} = [(\text{molecular weight of peak maximum on high molecular weight side of starting material natural rubber}) - (\text{molecular weight of peak maximum on high molecular weight side of modified natural rubber})]/[\text{molecular weight of peak maximum on high molecular weight side of starting material natural rubber}] \times 100$$

(1) Apparatus: HLC-8220 made by TOSOH CORPORATION
(2) Separation columns: HM-H made by TOSOH CORPORATION (two columns in series)
(3) Measurement temperature: 40° C.
(4) Carrier: tetrahydrofuran
(5) Flow rate: 0.6 mL/min
(6) Injection amount: 5 μL
(7) Detector: differential refractometer
(8) Molecular weight standards: polystyrene standards (Average Particle Size)

Average particle size of the natural rubbers was determined from particle size distributions (by volume) determined with a laser diffraction particle size distribution analyzer ("Mastersizer 3000" made by Malvern Instruments).

TABLE 1

| | Modified natural rubber | First treatment | Second treatment | Coagulation method | Nitrogen content (mass %) | Phosphorus content (ppm) | Gel content (mass %) | Rate of change in high molecular weight components (%) |
|---|---|---|---|---|---|---|---|---|
| Production Example 1 | Modified natural rubber 1 | Deprotenization | Lipid degradation | Coagulation with acid | 0.13 | 119 | 6.3 | 32 |
| Production Example 2 | Modified natural rubber 2 | Deprotenization | Lipid degradation | Coagulation with salt | 0.11 | 112 | 5.4 | 28 |
| Production Example 3 | Modified natural rubber 3 | Deprotenization | Lipid degradation | Coagulation with polymer flocculant | 0.03 | 64 | 1.8 | 31 |
| Production Example 4 | Modified natural rubber 4 | Deprotenization | Phospholipid degradation | Coagulation with acid | 0.13 | 78 | 8.2 | 37 |
| Production Example 5 | Modified natural rubber 5 | Deprotenization | Phospholipid degradation | Coagulation with salt | 0.09 | 69 | 7.5 | 41 |
| Production Example 6 | Modified natural rubber 6 | Deprotenization | Phospholipid degradation | Coagulation with polymer flocculant | 0.02 | 61 | 1.7 | 43 |
| Production Example 7 | Comparative modified natural rubber 7 | Lipid degradation | Deprotenization | Coagulation with polymer flocculant | 0.14 | 278 | 15.4 | 12 |
| Production Example 8 | Comparative modified natural rubber 8 | Phospholipid degradation | Deprotenization | Coagulation with polymer flocculant | 0.12 | 232 | 12.3 | 11 |
| Production Example 9 | Comparative modified natural rubber 9 | Deprotenization and Lipid degradation | Not performed | Coagulation with polymer flocculant | 0.19 | 292 | 15.3 | 10 |

TABLE 2

| | Modified natural rubber | Centrifugation | First treatment | Second treatment | Coagulation method | Average particle size (μm) | Nitrogen content (mass %) | Phosphorus content (ppm) | Gel content (%) |
|---|---|---|---|---|---|---|---|---|---|
| Production Example 11 | Modified natural rubber 11 | Performed | Not performed | Not performed | Coagulation with polymer flocculant | 0.120 | 0.33 | 423 | 9.6 |
| Production Example 12 | Modified natural rubber 12 | Performed | Deprotenization | Not performed | Coagulation with polymer flocculant | 0.110 | 0.04 | 254 | 5.9 |
| Production Example 13 | Modified natural rubber 13 | Performed | Not performed | Lipid degradation | Coagulation with polymer flocculant | 0.090 | 0.13 | 60 | 6.8 |
| Production Example 14 | Modified natural rubber 14 | Performed | Not performed | Phospholipid degradation | Coagulation with polymer flocculant | 0.111 | 0.16 | 64 | 6.5 |
| Production Example 15 | Modified natural rubber 15 | Performed | Deprotenization | Lipid degradation | Coagulation with acid | 0.098 | 0.01 | 70 | 5.5 |
| Production Example 16 | Modified natural rubber 16 | Performed | Deprotenization | Lipid degradation | Coagulation with polymer flocculant | 0.130 | 0.01 | 65 | 3.1 |
| Production Example 17 | Modified natural rubber 17 | Performed | Deprotenization | Phospholipid degradation | Coagulation with polymer flocculant | 0.094 | 0.01 | 65 | 2.8 |
| Production Example 18 | Comparative natural rubber | Not performed | Not performed | Not performed | Coagulation with polymer flocculant | 1.105 | 0.43 | 435 | 23.5 |

The chemicals used in Examples and Comparative Examples are listed below:

Modified natural rubbers 1 to 6: Modified natural rubbers 1 to 6 prepared in Production Examples 1 to 6

Comparative modified natural rubbers 7 to 9: Comparative modified natural rubbers 7 to 9 prepared in Production Examples 7 to 9

Modified natural rubbers 11 to 17: Modified natural rubbers 11 to 17 prepared in Production Examples 11 to 17

Comparative natural rubber: Comparative natural rubber prepared in Production Example 18

BR: BR150B made by Ube Industries, Ltd. (cis content: 97 mass %)

Carbon black: SHOBLACK N220 made by Cabot Japan K.K. ($N_2$SA: 111 m$^2$/g, DBP: 115 ml/100 g)

Antioxidant: NOCRAC 6C (N-(1,3-dimethylbutyl)-N'-phenyl-p-phenylenediamine, 6PPD) made by OUCHI SHINKO CHEMICAL INDUSTRIAL CO., LTD.

Stearic acid: Tsubaki made by NOF CORPORATION

Zinc oxide: zinc oxide #1 made by MITSUI MINING & SMELTING CO., LTD.

Sulfur: powdered sulfur made by TSURUMI CHEMICAL INDUSTRY CO., LTD.

Vulcanization accelerator: NOCCELER NS (N-tert-butyl-2-benzothiazolylsulfeneamide) made by OUCHI SHINKO CHEMICAL INDUSTRIAL CO., LTD.

(Preparation of Unvulcanized Rubber Composition and Vulcanized Rubber Composition)

The materials excluding the sulfur and the vulcanization accelerator were compounded as shown in Table 3 or 4, and were kneaded with a 1.7-L Banbury mixer to prepare a kneaded mixture. Next, the sulfur and the vulcanization accelerator were kneaded into the kneaded mixture using an open roll mill to prepare an unvulcanized rubber composition. Then, the unvulcanized rubber composition was press vulcanized in a 2 mm-thick metal mold at 150° C. for 30 minutes to prepare a vulcanized rubber composition (vulcanized rubber sheet).

The thus obtained unvulcanized rubber compositions and vulcanized rubber compositions were evaluated for the following items. The results are shown in Tables 3 and 4.

(Mooney Viscosity)

Mooney viscosity of the unvulcanized rubber compositions was measured at 130° C. in accordance with JIS K 6300. The Mooney viscosities ($ML_{1+4}$) of Examples 1 to 6 and Comparative Examples 1 to 3 are expressed as an index calculated using the equation below, with the value of Comparative Example 1 set equal to 100.

(Mooney viscosity index)=($ML_{1+4}$ of Comparative Example 1)/($ML_{1+4}$ of each composition)×100

The Mooney viscosities ($ML_{1+4}$) of Examples 11 to 17 and Comparative Example 11 are also expressed as an index calculated using the equation below, with the value of Comparative Example 11 set equal to 100.

(Mooney viscosity index)=($ML_{1+4}$ of Comparative Example 1)/($ML_{1+4}$ of each composition)×100

In each case, a higher index indicates a lower Mooney viscosity and better processability.

(Rubber Strength)

The vulcanized rubber compositions were subjected to tensile testing on No. 3 dumbbell specimens in accordance with JIS K6251 "Rubber, vulcanized or thermoplastics—Determination of tensile stress-strain properties" to determine elongation at break. The elongations at break of Examples 1 to 6 and Comparative Examples 1 to 3 are expressed as an index calculated using the equation below, with the value of Comparative Example 1 set equal to 100.

(Rubber strength index)=(elongation at break of each composition)/(elongation at break of Comparative Example 1)×100

The elongations at break of Examples 11 to 17 and Comparative Example 11 are also expressed as an index calculated using the equation below, with the value of Comparative Example 11 set equal to 100.

(Rubber strength index)=(elongation at break of each composition)/(elongation at break of Comparative Example 11)×100

In each case, a higher index indicates higher rubber strength and better cutting and chipping resistance, which is considered to result in better breaking performance.

(Abrasion Resistance)

Vulcanized rubber Lambourn abrasion test pieces prepared from the vulcanized rubber compositions were abraded using a Lambourn abrasion tester made by Iwamoto Seisakusho K.K. under a load of 3.0 kg at a surface rotational speed of 50 m/min, a rate of dusting powder of 15 g/min, and a slip ratio of 20% to measure the Lambourn abrasion amount, from which volume loss was calculated. The results of the compositions of Examples 1 to 6 and Comparative Examples 1 to 3 are expressed as an abrasion resistance index calculated using the equation below, with the value of Comparative Example 1 set equal to 100.

(Abrasion resistance index)=(volume loss of Comparative Example 1)/(volume loss of each composition)×100

The results of the compositions of Examples 11 to 17 and Comparative Example 11 are also expressed as an abrasion resistance index calculated using the equation below, with the value of Comparative Example 11 set equal to 100.

(Abrasion resistance index)=(volume loss of Comparative Example 11)/(volume loss of each composition)×100

In each case, a higher abrasion resistance index indicates better abrasion resistance.

TABLE 3

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Formulation (parts by mass) | Modified natural rubber 1 | 80 | — | — | — | — | — | — | — | — |
| | Modified natural rubber 2 | — | 80 | — | — | — | — | — | — | — |
| | Modified natural rubber 3 | — | — | 80 | — | — | — | — | — | — |
| | Modified natural rubber 4 | — | — | — | 80 | — | — | — | — | — |
| | Modified natural rubber 5 | — | — | — | — | 80 | — | — | — | — |
| | Modified natural rubber 6 | — | — | — | — | — | 80 | — | — | — |
| | Comparative modified natural rubber 7 | — | — | — | — | — | — | 80 | — | — |
| | Comparative modified natural rubber 8 | — | — | — | — | — | — | — | 80 | — |
| | Comparative modified natural rubber 9 | — | — | — | — | — | — | — | — | 80 |
| | BR | 20 | 20 | 20 | 20 | 20 | 20 | 20 | 20 | 20 |
| | Carbon black | 50 | 50 | 50 | 50 | 50 | 50 | 50 | 50 | 50 |
| | Antioxidant | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 3 | 3 | 3 | 3 | 3 | 3 | 3 | 3 | 3 |
| | Sulfur | 1 | 1 | 1 | 1 | 1 | 1 | 1 | 1 | 1 |
| | Vulcanization accelerator | 1.5 | 1.5 | 1.5 | 1.5 | 1.5 | 1.5 | 1.5 | 1.5 | 1.5 |
| Evaluation | Mooney viscosity (index) | 111 | 109 | 112 | 110 | 108 | 113 | 100 | 99 | 99 |
| | Abrasion resistance (index) | 111 | 108 | 111 | 109 | 107 | 110 | 100 | 98 | 100 |
| | Rubber strength (index) | 115 | 108 | 114 | 111 | 109 | 112 | 100 | 99 | 97 |

TABLE 4

|  |  | Example 11 | Example 12 | Example 13 | Example 14 | Example 15 | Example 16 | Example 17 | Comparative Example 11 |
|---|---|---|---|---|---|---|---|---|---|
| Formulation (parts by mass) | Modified natural rubber 11 | 80 | — | — | — | — | — | — | — |
|  | Modified natural rubber 12 | — | 80 | — | — | — | — | — | — |
|  | Modified natural rubber 13 | — | — | 80 | — | — | — | — | — |
|  | Modified natural rubber 14 | — | — | — | 80 | — | — | — | — |
|  | Modified natural rubber 15 | — | — | — | — | 80 | — | — | — |
|  | Modified natural rubber 16 | — | — | — | — | — | 80 | — | — |
|  | Modified natural rubber 17 | — | — | — | — | — | — | 80 | — |
|  | Comparative natural rubber | — | — | — | — | — | — | — | 80 |
|  | BR | 20 | 20 | 20 | 20 | 20 | 20 | 20 | 20 |
|  | Carbon black | 50 | 50 | 50 | 50 | 50 | 50 | 50 | 50 |
|  | Antioxidant | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 |
|  | Zinc oxide | 3 | 3 | 3 | 3 | 3 | 3 | 3 | 3 |
|  | Sulfur | 1 | 1 | 1 | 1 | 1 | 1 | 1 | 1 |
|  | Vulcanization accelerator | 1.5 | 1.5 | 1.5 | 1.5 | 1.5 | 1.5 | 1.5 | 1.5 |
| Evaluation | Mooney viscosity (index) | 97 | 103 | 101 | 111 | 110 | 112 | 113 | 100 |
|  | Abrasion resistance (index) | 125 | 124 | 124 | 128 | 129 | 133 | 134 | 100 |
|  | Rubber strength (index) | 123 | 121 | 123 | 125 | 131 | 128 | 129 | 100 |

The results of Table 1 show that, from the comparison between modified natural rubber 3 prepared through deproteinization followed by lipid degradation and comparative modified natural rubber 7 prepared through lipid degradation followed by deproteinization, or from the comparison between modified natural rubber 6 prepared through deproteinization followed by phospholipid degradation and comparative modified natural rubber 8 prepared through phospholipid degradation followed by deproteinization, the modified natural rubbers prepared through deproteinization followed by lipid degradation or phospholipid degradation, that is, the modified natural rubbers prepared by performing these treatments in a specific order, had lower nitrogen content, lower phosphorus content, lower gel content, and greater rate of change in high molecular weight components.

The results of Table 3 also demonstrate that a balanced improvement in abrasion resistance, breaking performance, and processability was achieved in the examples using the rubber compositions containing such modified natural rubbers.

Moreover, the results of Table 2 show that the modified natural rubbers prepared by controlling the average particle size of natural rubber to a specific value or less by centrifugation (Production Examples 11 to 17) had low nitrogen content, low phosphorus content, and low gel content.

The results of Table 4 also demonstrate that a balanced improvement in abrasion resistance, breaking performance, and processability was achieved in the examples using the rubber compositions containing such modified natural rubbers.

The invention claimed is:

1. A rubber composition for tires, comprising a modified natural rubber, the modified natural rubber prepared by treating natural rubber latex with a proteolytic enzyme, and then treating the treated natural rubber latex with at least one of a lipolytic enzyme or a phospholipid degrading enzyme.

2. The rubber composition for tires according to claim 1, wherein the modified natural rubber is prepared by centrifuging the natural rubber latex before the treatment with the proteolytic enzyme.

3. The rubber composition for tires according to claim 1, wherein the modified natural rubber has a nitrogen content of 0.30 mass % or less.

4. The rubber composition for tires according to claim 1, wherein the modified natural rubber has a phosphorus content of 200 ppm or less.

5. The rubber composition for tires according to claim 1, wherein the modified natural rubber has a gel content of 20 mass % or less.

6. The rubber composition for tires according to claim 1, wherein a molecular weight of a peak maximum on a high molecular weight side in a molecular weight distribution of the modified natural rubber is 20% or more smaller than a molecular weight of a peak maximum on a high molecular weight side in a molecular weight distribution of the natural rubber.

7. The rubber composition for tires according to claim 1, wherein a molecular weight of a peak maximum on a high molecular weight side in a molecular weight distribution of the modified natural rubber is $2.0 \times 10^6$ or more.

8. The rubber composition for tires according to claim 1, wherein the modified natural rubber is prepared by further coagulating the resulting natural rubber latex the with (1) an acid and (2) at least one of: (i) at least one salt selected from the group consisting of calcium salts, sodium salts, potassium salts, and ammonium salts of nitric acid, sulfuric acid, carbonic acid, phosphoric acid, hydrochloric acid, and formic acid; and (ii) a polymer flocculant.

9. A pneumatic tire, comprising the rubber composition for tires according to claim 1.

* * * * *

UNITED STATES PATENT AND TRADEMARK OFFICE
CERTIFICATE OF CORRECTION

PATENT NO. : 10,138,359 B2
APPLICATION NO. : 14/864087
DATED : November 27, 2018
INVENTOR(S) : Matsuura et al.

It is certified that error appears in the above-identified patent and that said Letters Patent is hereby corrected as shown below:

On the Title Page

Please change:
"(71) Applicant: SUMITOMO RUBBER INDUSTRIES, LTD., Kobe-shi, Hoygo (JP)"
To:
-- (71) Applicant: SUMITOMO RUBBER INDUSTRIES, LTD., Kobe-shi, Hyogo (JP) --

Signed and Sealed this
Fourteenth Day of January, 2020

Andrei Iancu
*Director of the United States Patent and Trademark Office*